United States Patent [19]
Heinz

[11] Patent Number: 5,261,751
[45] Date of Patent: Nov. 16, 1993

[54] DEVICE FOR REMOVING OIL FROM ANNULAR SPACES

[75] Inventor: Norbert Heinz, Uechtelhausen, Fed. Rep. of Germany

[73] Assignee: FAG Kugelfischer Georg Schafer KGaA, Fed. Rep. of Germany

[21] Appl. No.: 920,453

[22] PCT Filed: Dec. 20, 1991

[86] PCT No.: PCT/DE91/00999
§ 371 Date: Aug. 20, 1992
§ 102(e) Date: Aug. 20, 1992

[87] PCT Pub. No.: WO92/11470
PCT Pub. Date: Jul. 9, 1992

[30] Foreign Application Priority Data
Dec. 21, 1990 [DE] Fed. Rep. of Germany ....... 4041389

[51] Int. Cl.$^5$ .................. F16C 33/66; F16C 37/00
[52] U.S. Cl. .................. 384/466; 384/467; 384/474
[58] Field of Search ........... 384/466, 467, 474, 606, 384/472, 316, 313

[56] References Cited

U.S. PATENT DOCUMENTS

| | | | |
|---|---|---|---|
| 2,919,962 | 1/1960 | Hencken et al. | 384/466 |
| 4,385,788 | 5/1983 | Brown et al. | 384/467 |
| 4,596,476 | 6/1986 | Schill et al. | 384/467 |
| 4,884,903 | 12/1989 | Pham et al. | 684/467 |

*Primary Examiner*—Lenard A. Footland
*Attorney, Agent, or Firm*—Ostrolenk, Faber, Gerb & Soffen

[57] ABSTRACT

To remove oil from an antifriction bearing, an annular space is defined between the outer and inner rings next to the row of bearing elements. A stationary part is at the inner ring. An oil discharge hole passes through the stationary part. An oil guide plate having an obliquely inclined baffle plate part extends partially around the rear side of the discharge hole and up into the annular space from the stationary part to guide oil into the discharge hole.

9 Claims, 2 Drawing Sheets

DEVICE FOR REMOVING OIL FROM ANNULAR SPACES

BACKGROUND OF THE INVENTION

The present invention relates to a device for removing oil from annular spaces along side an anti-friction bearing wherein the stationary part around the bearing race discharges oil.

Antifriction bearings are lubricated, inter alia, with oil. It is frequently necessary to use this oil at the same time as means to remove heat from the bearing. For this, circulation of the lubricant is necessary. In many cases, oil is therefore fed and discharged through channels. Since oil discharge holes are normally arranged perpendicular to the rotating shaft, the oil can generally not pass out of the bearing space immediately. Accordingly, particularly in the case of high speeds of rotation, a large amount of milling work takes place in the bearing, whereby heat is additionally produced. It must, therefore, be seen to it that the oil introduced is removed over the shortest possible path. From EP Unexamined Application for Patent 232 978, a device is known in which the oil is removed through oil discharge openings which are connected tangentially to the annular spaces of the bearing. Such tangential holes are, however, difficult to produce in many cases. In particular, however, existing bearing housings having vertically arranged holes cannot be readily equipped with this device.

SUMMARY OF THE INVENTION

One object of the present invention is therefore to provide a device by means of which these disadvantages are avoided and with, which an easily produced and installable mean for removal of the oil, which means is compact but nevertheless highly effective, is obtained.

If an oil guide plate is arranged alongside of the antifriction bearing in the annular space radially inside each oil discharge hole, the oil which is entrained by the moving parts and accumulates in this annular space is picked up by said plate and conveyed into the hole. If this oil guide plate is produced as a separate part, the construction is simple. The oil guide plate in that case is of a funnel-like construction and can be applied to a ring which is arranged alongside the bearing and at the same time serves as spacer ring. A ringless embodiment is also possible in which merely a funnel-like structure having a length of tube welded, for instance, thereon is used. In this case, the length of tube is inserted into the hole. In these embodiments it is hydrodynamically favorable for the baffle plate to be curved or directed obliquely to the entrance of the hole.

These embodiments furthermore have the advantage that, in different cases of use with a different quantity of oil, baffle plates having different heights which are adapted thereto can be used.

The device described can be used with the same advantages both in an embodiment with rotating shaft in which the oil baffle plate is fastened to the housing and in an embodiment with rotating housing in which the oil baffle plate is arranged on the shaft.

From Federal Republic of Germany Provisional Patent AS 22 09 345, a skimming member is known by means of which oil is also accumulated and conveyed further, but in that case, the skimming member rotates, which is more expensive. In the solution in accordance with the present invention, the skimming member is stationary. In this case, the kinetics of the circulating oil is used in order to remove the oil.

The invention will be described in further detail with reference to four figures.

DESCRIPTION OF THE PREFERRED EMBODIMENTS

Figure 1:
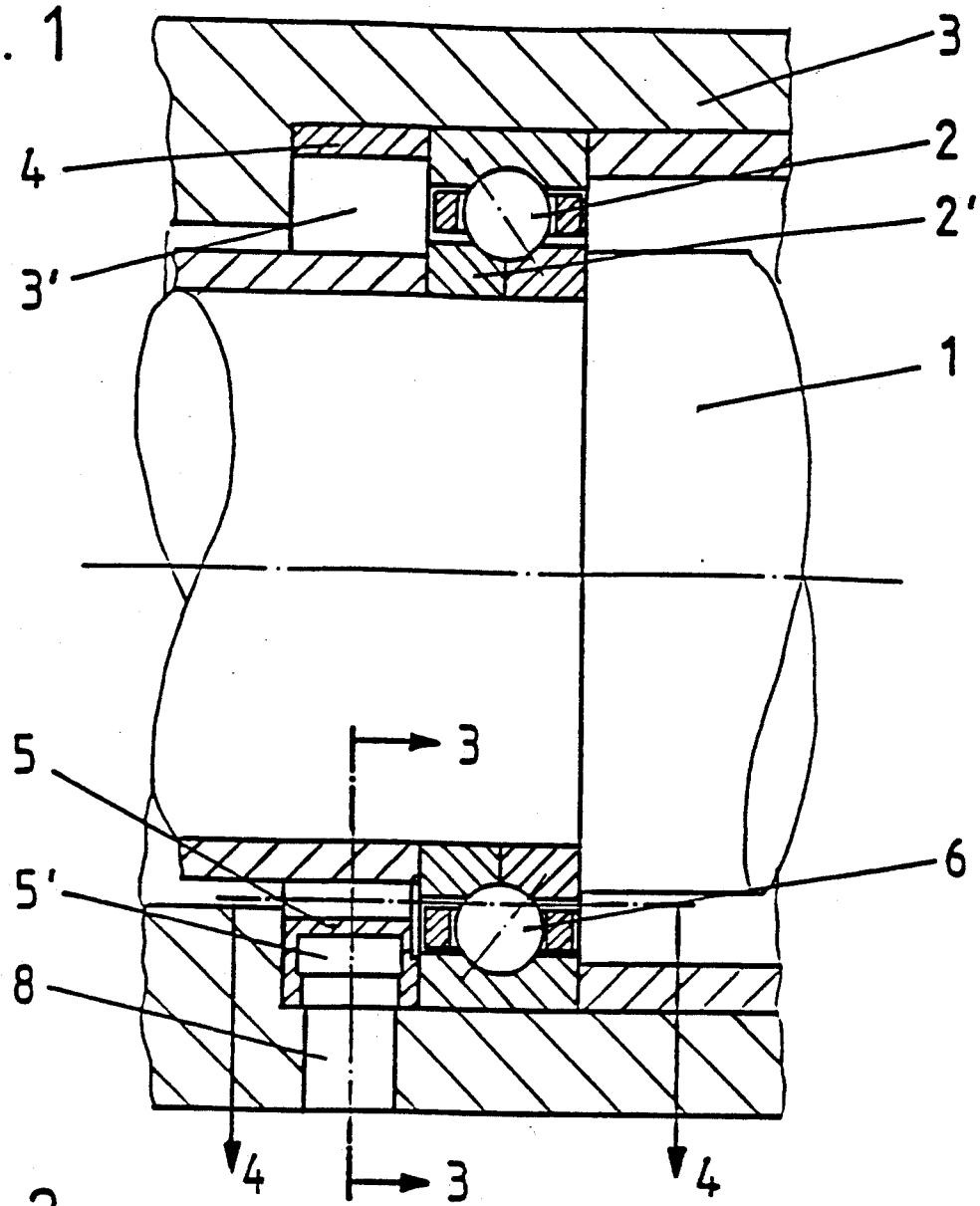
FIG. 1 is a longitudinal section through an antifriction bearing having the device in accordance with the invention.
Figure 2:
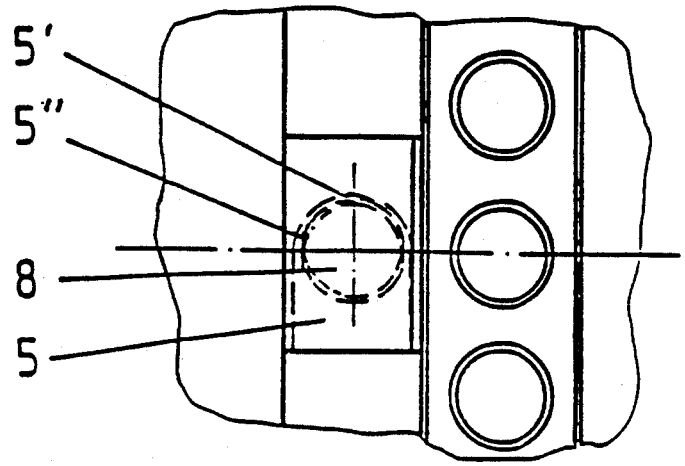
FIG. 2 is a view along the line A—A of FIG. 1.
Figure 3:
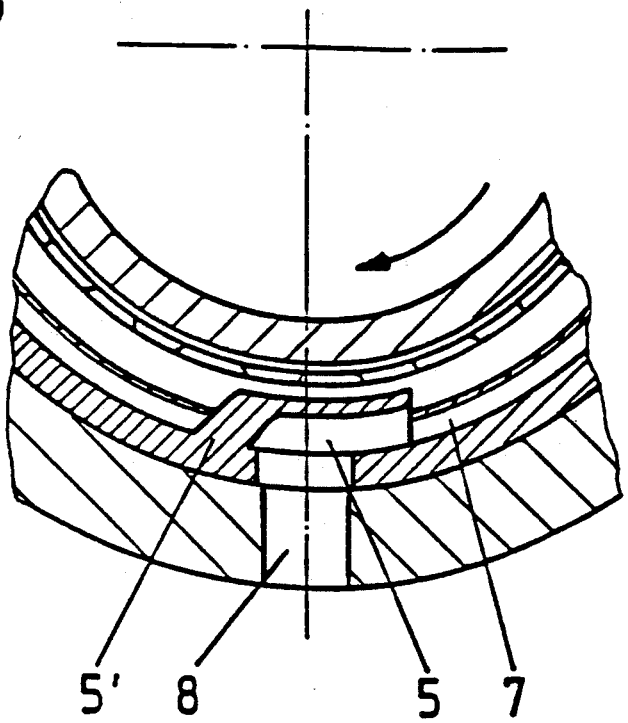
FIG. 3 shows the partial cross section B—B of FIG. 1.

In the antifriction bearing of FIG. 1, a ball bearing 2, which rests in the stationary housing 3' is arranged on the rotating shaft 1. Within an annular space 3' of the housing 3 alongside the bearing 2, there is provided an easily produced spacer ring 4 which not only fixes the axial position of the bearing 2 but is also provided with the oil guide plate 5. As can be better noted from FIGS. 2 and 3, this plate consists of a funnel-like structure the main part of which represents a baffle plate 5'. This baffle plate 5' has the result that the oil 7 which collects on the inner surface of the spacer ring 4 due to the rotating parts, such as shaft 1, bearing inner ring 2' and balls 6, and is conveyed in the direction of rotation (see FIG. 3) is skimmed off and then conducted further into the radially directed discharge hole 8. In this way, the amount of oil which, for instance for reasons of cooling, is relatively large is removed rapidly from the bearing space. Thus, the milling work and the heating of the oil and of the antifriction bearing resulting therefrom are avoided.

Figure 4:
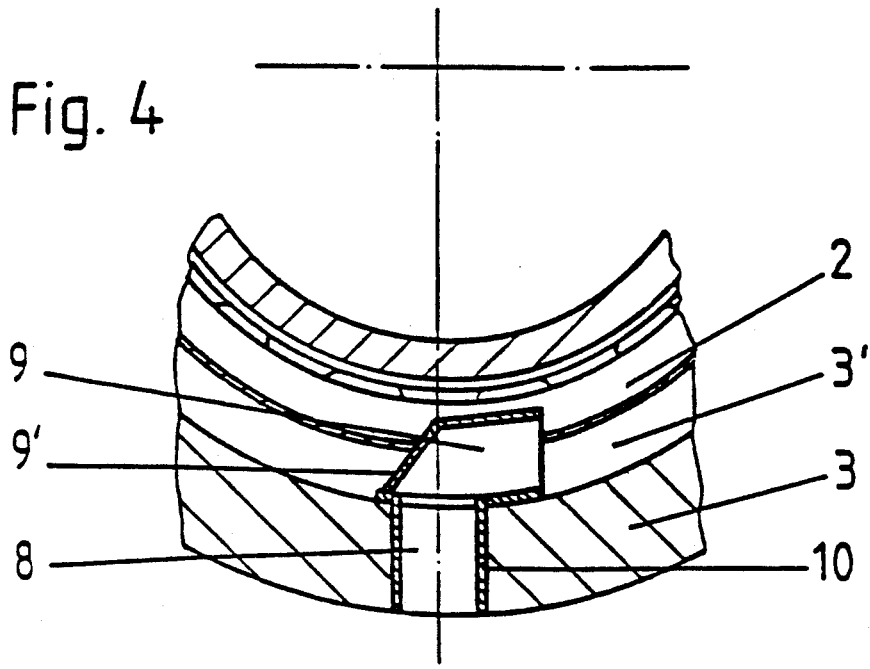
FIG. 4 shows a variant of FIG. 3.

FIG. 4 shows an even simpler embodiment. In this case, there is provided as oil guide plate within the annular space 3' merely a funnel-like structure 9 having the baffle plate 9' which is connected to a length of tube 10 which is welded thereon and therefore simple to produce. The length of tube is then introduced into the hole 8.

I claim:

1. A device for removing oil from an antifriction bearing,
   the bearing comprising an inner ring, an outer ring around and spaced out from the inner ring, bearing elements between the inner and the outer rings, so that the rings can rotate relatively; one of the rings being relatively stationary with reference to rotation of the other ring;
   the inner and the outer rings both extending axially away from the bearing elements in one direction to define an annular space which is located between the inner and the outer rings and axially alongside the bearing elements;
   the device for removing oil comprising:
   a stationary part at the one bearing ring around the annular space; at least one oil discharge hole passing through the stationary part from the annular space for discharging oil from the annular space through the oil discharge hole;
   an oil guide plate in the annular space located behind or after the oil discharge hole in the direction of rotation of the other ring; the guide plate including a baffle plate extending out of the stationary part into the annular space and extending from a location at the stationary part which is behind the oil discharge hole, the baffle plate being directed obliquely in the direction around the annular space counter to the direction of rotation of the other ring and also directed obliquely across the annular space for directing oil into the oil discharge hole.

2. The device of claim 1, wherein the oil guide plate and the baffle plate are together to define a separate part located at the stationary part.

3. The baffle plate of claim 1, wherein there are a plurality of the baffle plates of different heights above the stationary part.

4. The device of claim 1, wherein in a radial top view, the baffle plate is curved at least on the axial side of the oil discharge hole that is away from the bearing elements.

5. The device of claim 1, further comprising a stationary ring in the annular space which is stationary along with the stationary part; the oil guide plate being integrated with the stationary ring.

6. The device for removing oil of clean 1, wherein the oil guide plate includes a part that is spaced above the baffle plate and above the oil discharge hole in the annular space, and the part of the oil guide plate extends through the annular space counter to the direction of rotation of the other ring.

7. The device of claim 1, wherein the one ring is the outer ring, and the outer ring is stationary relative to rotation of the inner ring.

8. The device of claim 1, wherein the baffle plate extends only partially around the oil discharge hole and is located on the side of the discharge hole which is behind the oil discharge hole in the direction of rotation of the other ring.

9. The device of claim 8, wherein the baffle plate is curved around the oil discharge hole.

* * * * *